(12) United States Patent
Zhang (10) Patent No.: US 11,070,711 B2
(45) Date of Patent: Jul. 20, 2021

(54) TERMINAL, SCREEN ASSEMBLY, AND ELECTRONIC DEVICE

(71) Applicant: Guangdong OPPO Mobile Telecommunications Corp., Ltd., Guangdong (CN)

(72) Inventor: Haiping Zhang, Guangdong (CN)

(73) Assignee: GUANDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/563,542

(22) Filed: Sep. 6, 2019

(65) Prior Publication Data

US 2019/0394374 A1 Dec. 26, 2019

Related U.S. Application Data

(63) Continuation of application No. PCT/CN2018/075322, filed on Feb. 5, 2018.

(30) Foreign Application Priority Data

Mar. 7, 2017 (CN) .......................... 201710132541.3

(51) Int. Cl.
*H04N 5/225* (2006.01)
*G06F 1/16* (2006.01)
*H04M 1/02* (2006.01)

(52) U.S. Cl.
CPC ......... *H04N 5/2257* (2013.01); *G06F 1/1686* (2013.01); *H04M 1/0264* (2013.01); *H04M 1/0266* (2013.01); *H04N 5/22525* (2018.08)

(58) Field of Classification Search
CPC .............. H04N 5/2257; H04N 5/22525; G06F 1/1686; H04M 1/0264; H04M 1/0266
See application file for complete search history.

(56) References Cited

U.S. PATENT DOCUMENTS

| 10,389,927 B2* | 8/2019 | Zhang ................... G03B 29/00 |
| 2004/0145865 A1* | 7/2004 | Lin ..................... H04M 1/0208 361/679.3 |
| 2008/0198096 A1 | 8/2008 | Jung |
| 2015/0261393 A1 | 9/2015 | Sadatsuki et al. |
| 2016/0165023 A1* | 6/2016 | Song ................... H04M 1/0208 455/566 |

(Continued)

FOREIGN PATENT DOCUMENTS

| CN | 203812139 U | 9/2014 |
| CN | 203812145 U | 9/2014 |

(Continued)

OTHER PUBLICATIONS

International search report, PCT/CN2018/075322, dated Aug. 5, 2018 (3 pages).

(Continued)

*Primary Examiner* — Md K Talukder (57) ABSTRACT

The present disclosure provides a terminal, a screen assembly and an electronic device. The terminal includes a terminal body and a rotating body. The rotating body includes a first end face. The first camera is arranged on the first end face. The rotating body is rotatably coupled to one end of the terminal body, so that the first camera selectively faces toward around the terminal body.

1 Claim, 12 Drawing Sheets

(56) References Cited

U.S. PATENT DOCUMENTS

| | | | | |
|---|---|---|---|---|
| 2016/0241686 A1* | 8/2016 | Zhang | .................... | G06F 1/1639 |
| 2017/0090524 A1* | 3/2017 | Gao | ....................... | H01R 27/02 |
| 2019/0394374 A1* | 12/2019 | Zhang | .................... | G06F 1/1622 |
| 2020/0344338 A1* | 10/2020 | Yang | ..................... | H04N 5/2257 |
| 2020/0344340 A1* | 10/2020 | Kinouchi | ............ | H04M 1/0264 |
| 2020/0351446 A1* | 11/2020 | Maalouf | ............ | H04N 5/23216 |

FOREIGN PATENT DOCUMENTS

| | | | |
|---|---|---|---|
| CN | 105373190 A | 3/2016 | |
| CN | 106886255 A | 6/2017 | |

OTHER PUBLICATIONS

European search report, EP18763147 dated Dec. 12, 2019 (8 pages).
European examination report EP18763147, dated Oct. 12, 2020 (10 pages).
Indian First Examination Report for IN Application 201917032893 dated Apr. 9, 2021. (5 pages).

* cited by examiner

FIG. 12

TERMINAL, SCREEN ASSEMBLY, AND ELECTRONIC DEVICE

CROSS-REFERENCE TO RELATED APPLICATION(S)

The present application is a continuation of International Patent Application No. PCT/CN2018/075322, filed on Feb. 5, 2018, which claims foreign priority of Chinese Patent Application No. 201710132541.3, filed on Mar. 7, 2017, the contents of both of which are herein incorporated by reference in their entireties.

TECHNICAL FIELD

The described embodiments relate to a terminal technology, and more particularly, to a terminal, a screen assembly, and an electronic device.

BACKGROUND

Mobile phones have become an indispensable terminal device in everyone's life, and functions of the mobile phones are also increasing.

In the related art, a general mobile phone uses a front camera to implement a front camera function, and a rear camera to implement a rear camera function. However, setting two cameras to realize the front camera function and the rear camera function respectively is not conducive to make the mobile phones thinner and lighter.

SUMMARY

In one aspect, a terminal is provided in some embodiments of the present disclosure. The terminal may include a terminal body and a rotating body. The rotating body may include a first end face. The first camera may be arranged on the first end face. The rotating body may be rotatably coupled to one end of the terminal body, so that the first camera may selectively face toward around the terminal body.

In another aspect, the present disclosure provides a screen assembly. The screen assembly may include a first screen defining a recess. The recess may be recessed from a top of the first screen toward a bottom and extend through the first screen along a thickness direction of the first screen. The screen assembly may further include a rotatable element having a camera. The rotatable element with the camera may be received in the recess and pivotally coupled to the first screen and capable of rotating in the recess relative to the first screen.

According to still another aspect of the present disclosure, an electronic device may comprise a first body, a second body and a connection mechanism connected the first and second bodies together. The first body may include a first screen and a first camera. The first screen and the first camera may be located two opposite surfaces of the first body. The second body may include a second screen. The connection mechanism is provided between the first and second bodies such that the first body is pivotably coupled to the second body and capable of rotating relative to the second body. When the first camera is operative as a front camera, the first and second screens are opposite to each other. When the camera is operative as a rear camera, display surfaces of the first and second screens are coplanar.

DETAILED DESCRIPTION

The embodiments of the present disclosure are described in detail below, and the examples of the embodiments are illustrated in the drawings, wherein the same or similar reference numerals are used to refer to the same or similar elements or elements having the same or similar functions. The embodiments described below with reference to the accompanying drawings are intended to be illustrative only, and are not to be construed as limiting.

In the description of the present disclosure, it is to be understood that terms such as "center", "longitudinal", "lateral", "length", "width", "thickness", "upper", "lower", "front", "rear", "left", "right", "vertical", "horizontal", "top", "bottom", "inner", "outer", "clockwise", "counterclockwise", and the like, refer to the orientations and locational relations illustrated in the accompanying drawings. Thus, these terms used here are only for describing the present disclosure and for describing in a simple manner, and are not intended to indicate or imply that the device or the elements are disposed to locate at the specific directions or are structured and performed in the specific directions, which could not to be understood as limiting the present disclosure. In addition, features defining "first" and "second" may include one or more of the features, either explicitly or implicitly. In the description of the present disclosure, "a plurality" means two or more unless otherwise stated.

In the present disclosure, unless specified or limited, otherwise, terms "installed", "connected", "coupled", and the like are used in a broad sense, and may include, for example, fixed connections, detachable connections, or integral connections; may also be mechanical or electrical connections; may also be direct connections or indirect connections via intervening structures; may also be inner communications of two elements, as can be understood by one skilled in the art depending on specific contexts.

In the present invention, the first feature "on" or "under" the second feature may include direct contact of the first and second features, and may also include that the first and second features are not in direct contact but are contacted by additional features between them. It is not in direct contact but through additional features between them. Moreover, the first feature "above", "upper" and "superjacent" the second feature includes the first feature directly above and skew above the second feature, or merely indicating that the first feature level is higher than the second feature. The first feature "below", and "lower" the second feature includes the first feature directly below and skew below the second feature, or merely the first feature level is less than the second feature.

The following disclosure provides many different embodiments or examples for implementing different structures of the present invention. In order to simplify the disclosure of the present invention, the components and arrangements of the specific examples are described below. Of course, they are merely examples and are not intended to limit the disclosure. In addition, the present disclosure may be repeated with reference to the numerals and/or reference numerals in the various examples, which are for the purpose of simplicity and clarity, and do not indicate the relationship between the various embodiments and/or arrangements discussed. Moreover, the present disclosure provides examples of various specific processes and materials, but one of ordinary skill in the art will recognize the use of other processes and/or the use of other materials.

According to an aspect of the present disclosure, a terminal may include a terminal body and a rotating body. The rotating body may include a first end face. The first camera may be arranged on the first end face. The rotating body may be rotatably coupled to one end of the terminal body, so that the first camera may selectively face toward around the terminal body.

In an embodiment, a first display screen may be arranged on a front face of the terminal body. The rotating body may further comprise a second end face opposite to the first end face. A second display screen may be arranged on the second end face. When the rotating body is rotated such that the second end face faces the front face of the terminal body, the first display screen and the second display screen are located in a same plane.

In an embodiment, the first display screen may comprise a first boundary line. The second display screen may comprise a second boundary line. When the rotating body is rotated such that the second end face faces the front face of the terminal body, the first boundary line coincides with the second boundary line.

In an embodiment, a through groove may be defined in the terminal body at a top end, wherein the through groove extends through the front face of the terminal body and a rear face of the terminal body. The rotating body is installed in the through groove.

In an embodiment, the first boundary line may be distributed along a boundary line between the through groove and the front face of the terminal body. The second boundary line may be distributed along a boundary line between the through groove and the front or the rear face of the terminal body.

In an embodiment, the through groove may extend along a direction perpendicular to the first display screen.

In an embodiment, a first connecting structure and a second connecting structure may be arranged along a first axis at two opposite faces of the rotating body. The first connecting structure and the second connecting structure may be rotatably around the first axis respectively and are installed in inner faces of the through groove.

In an embodiment, the first axis may be parallel to the first display screen and perpendicular to an extending direction of the through groove.

In one embodiment, the rotating body may comprise a fifth end face facing the terminal body. A third connecting structure may be arranged on the fifth end face. A fourth connecting structure may be provided on a top end face of the terminal body. The third connecting structure may be rotatably coupled to the fourth connecting structure around a second axis. The second axis may be perpendicular to the top end face of the terminal body.

In an embodiment, when the rotating body rotates such that the second end face faces the front face or a rear face of the terminal body, the fifth end face coincides with the top end face of the terminal body.

In an embodiment, when the rotating body is rotated such that the second end face faces the front face of the terminal body, a boundary line of the first display screen facing the second display screen coincides with a boundary line of the second display screen facing the first display screen.

In an embodiment, the rotating body may further comprise a fourth end face. The fourth end face may be perpendicular to a width direction of the terminal body and parallel to a length direction of the terminal body. The first end face and the second end face may be perpendicular to a thickness direction of the terminal body. A length of the rotating body along the width direction may be greater than a length of the rotating body along the thickness direction; a second camera may be arranged in the rotating body. The second camera extends along the width direction. A light incident face of the second camera may be located at the fourth end face. A lens length of the second camera may be greater than a lens length of the first camera.

In an embodiment, the first camera may be arranged on the first end face away from the fourth end face.

In an embodiment, the through groove may comprise a first side wall face and a second side wall face opposite to each other. A fifth connecting structure may be defined on the first side wall face. A sixth connecting structure may be defined on the second side wall face. The fifth connecting structure and the sixth connecting structure may be opposite to each other and are both grooves. The first connecting structure and the second connecting structure may be both columnar structures. the first connecting structure may be around the first axis and may be rotatably installed in the fifth connection structure. The second connection structure may be around the first axis and rotatably installed in the sixth connection structure.

In an embodiment, each of the fifth connecting structure and the sixth connecting structure may be elongated and have a length greater than a diameter of each of the first connecting structure and the second connecting structure.

In one embodiment, the third connecting structure may comprise a columnar rotating shaft arranged on the fifth end face; and a limiting protrusion arranged on an end of the rotating shaft away from the rotating body. The limiting protrusion may be arranged on a side wall face of the rotating shaft. The limiting protrusion may be arranged on a side wall face of the rotating shaft. The fourth connecting structure may comprise a first stepped hole defined on the top end face and a second stepped hole defined on the top end face. The first stepped hole may be coaxial and communicated with the second stepped hole. The first stepped hole may be adjacent to the top end face. The second stepped hole may be away from the top end face. When the third connecting structure is installed in the fourth connecting structure, the rotating shaft is inserted in the first step hole, and the limiting protrusion is received in the second step hole. A radius of the first step hole may be adapted to a radius of the rotating shaft. A radius of the second step hole may be adapted to a radius of the limit protrusion. The radius of the second step hole may be larger than the radius of the first order hole.

According to another aspect of the present disclosure, a screen assembly may include a first screen defining a recess. The recess may be recessed from a top of the first screen toward a bottom and extend through the first screen along a thickness direction of the first screen. The screen assembly may further include a rotatable element having a camera. The rotatable element with the camera may be received in the recess and pivotally coupled to the first screen and capable of rotating in the recess relative to the first screen.

In an embodiment, the rotatable element may comprise a second screen. The camera and the second screen may be located two opposite surfaces of the rotatable element. When the camera is operative as a front camera, the first and second screens are opposite to each other. When the camera is operative as a rear camera, front surfaces of the first and second screens are coplanar.

According to still another aspect of the present disclosure, an electronic device may comprise a first body, a second body and a connection mechanism connected the first and second bodies together. The first body may include a first screen and a first camera. The first screen and the first camera may be located two opposite surfaces of the first body. The second body may include a second screen. The connection mechanism is provided between the first and second bodies such that the first body is pivotably coupled to the second body and capable of rotating relative to the second body. When the first camera is operative as a front camera, the first and second screens are opposite to each other. When the camera is operative as a rear camera, display surfaces of the first and second screens are coplanar.

In an embodiment, the first body may be embedded in the second body, the first body and the second body may be spliced with each other to form a cuboid. The connection mechanism may comprise a pair of shafts provided on two opposite sides of the first body and a pair of holes defined in the second body; the shafts engaged in the holes.

In an embodiment, the first body may have the same width and thickness as that of the second body. The first body may have a length shorter than that of the second body. The connection mechanism may comprise a shaft with a block provided on a bottom surface of the first body and a hole defined in the second body. The shaft may be engaged in the hole.

In an embodiment, the first body may further comprise a second camera located at a surface which connected with the two opposite surfaces.

In an embodiment, the connection mechanism may comprise a rotatable shaft and a block on an end of the shaft. The rotatable shaft may extend from a bottom surface of the first body toward the second body. An opening may be defined in the second body, the shaft and the block may be engaged in the opening.

In an embodiment, the second body may comprise a front surface, a rear surface and a pair of side surfaces. When the first and second screens are engaged with each other, the surface where the second camera is located is coplanar with one of the side surfaces.

Figure 1:
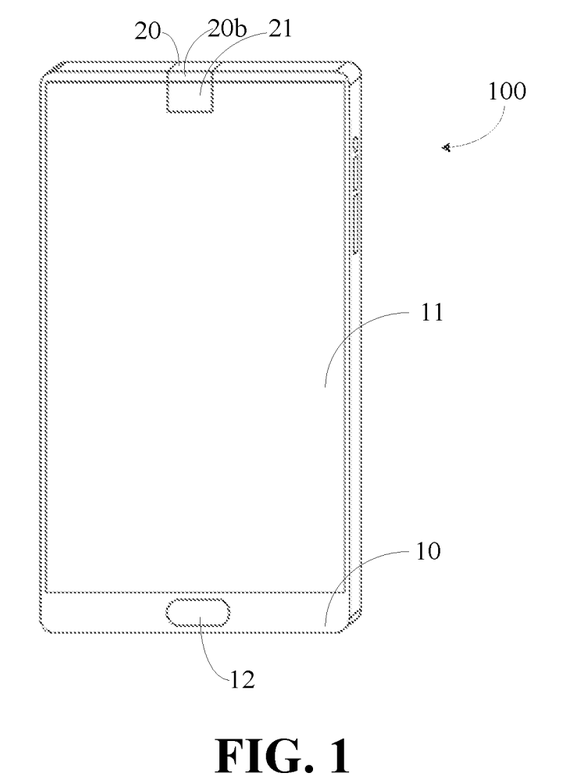
FIG. 1 is a structural illustration of a terminal in accordance with an embodiment in the present disclosure.
Figure 2:
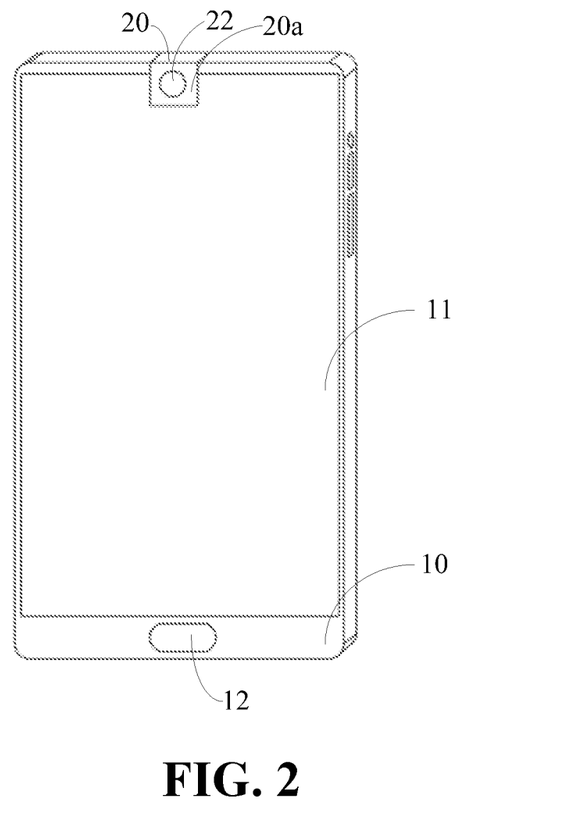
FIG. 2 is another structural illustration of a terminal in accordance with an embodiment in the present disclosure.
Figure 3:
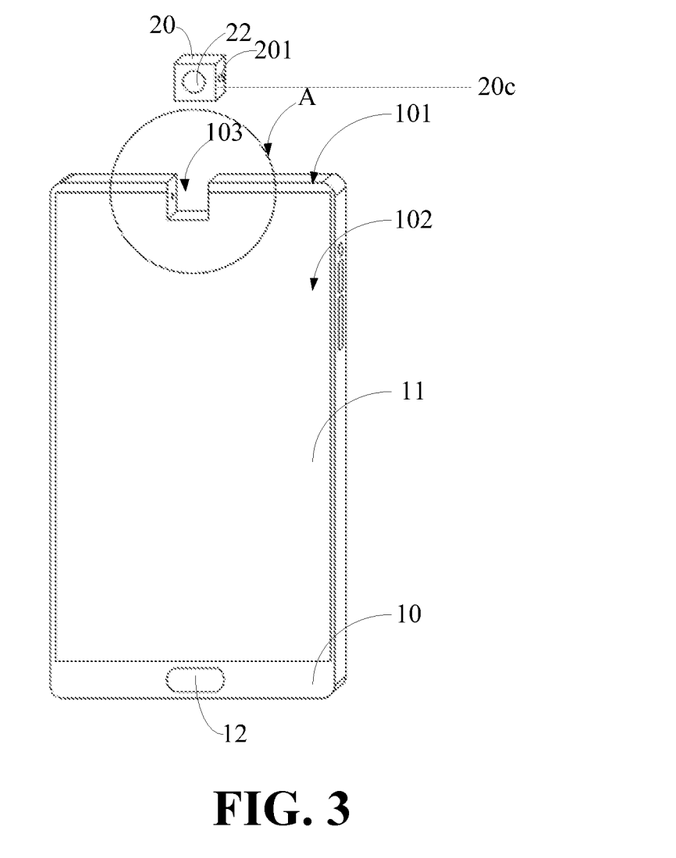
FIG. 3 is an exploded structural illustration of a terminal shown in FIG. 2.

Referring to FIGS. 1-3, in some embodiments, the terminal 100 may be a mobile phone, an IPAD, and the like. The terminal 100 may include a terminal body 10 and a rotating body 20.

A first display screen 11, a fingerprint module 12, a processor, a circuit board, and a sensor module may be arranged on the terminal body 10. The first display screen 11 may be a liquid crystal display screen or an organic light-emitting diode display screen. The fingerprint module 12 may capture a user's fingerprint and may be arranged on a front face of the terminal body 10. The processor, the circuit board, and the sensor module may be all arranged in the terminal body 10. The processor and sensor module may be arranged on the circuit board and electrically coupled to the circuit board.

The rotating body 20 may include a first end face 20a and a second end face 20b. The first end face 20a and the second end face 20b may be opposite to each other. A first camera 22 may be arranged on the first end face 20a of the rotating body 20. A second display screen 21 may be arranged on the second end face 20b of the rotating body 20. The rotating body 20 may be rotatably coupled to the terminal body 10, so that the first end face 20a of the rotating body 20 may selectively face toward around the terminal body 10. For example, the first end face 20a may face the front face of the terminal body 10, or the first end face 20a may face a rear face of the terminal body 10, or the first end face 20a may face one of two lateral faces of the terminal body 10.

For example, when the first camera 22 is required to realize the rear camera function (shown in FIG. 1), the second end face 20b may directly face the front face of the terminal body 10, and the first end face 20a may directly face the rear face of the terminal body 10. In addition, in this case, the first display screen 11 and the second display screen 21 may be spliced to display. When the first camera 22 is required to realize the front camera function (shown in FIG. 2), the first end face 20a may directly face the front face of the terminal body 10, and the second end face 20b may directly face the rear face of the terminal body 10.

In a practical application, the terminal body 10 may be substantially cuboid shape. Corners of the terminal body 10 may be rounded or chamfered. The terminal body 10 may include a top end face 101 and a bottom end face opposite to each other. The terminal body 10 may include two side faces opposite to each other. The terminal body 10 may include a front face 102 and a rear face opposite to each other. A through groove 103 may be defined in the terminal body 10 at the top end face 101. The through groove 103 may extend through the front face 102 of the terminal body 10 and the rear face of the terminal body 10.

Figure 4:
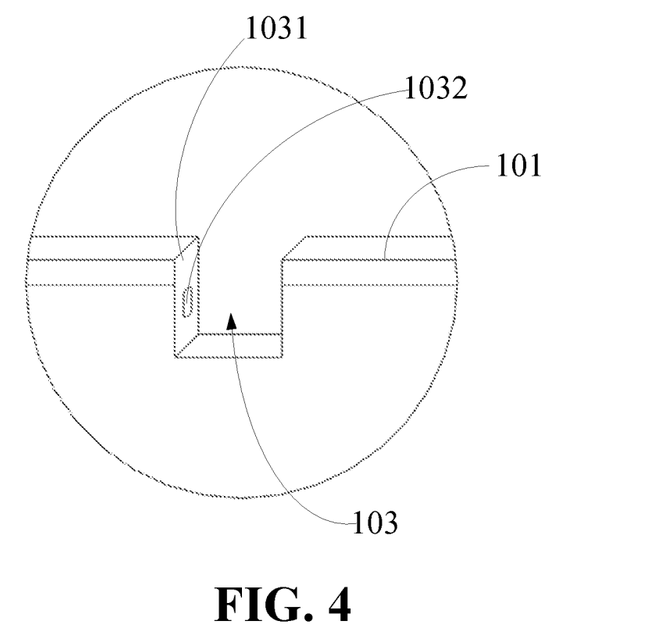
FIG. 4 is an enlarged view of area A in FIG. 3.

A cross-section of the through groove 103 may be substantially rectangular shape. The through groove 103 may extend along a direction perpendicular to the front face 102 and the rear face of the terminal body 10. FIG. 4 illustrates an enlarged view of area A in FIG. 3. The through groove 103 may include a first side wall face 1031 and a second side wall face opposite to each other. A fifth connecting structure 1032 may be provided on the first side wall face 1031. A sixth connecting structure may be provided on the second side wall face. The fifth connecting structure 1032 and the sixth connecting structure may be opposite to each other. The fifth connecting structure 1032 and the sixth connecting structure may be configured to rotatably couple to the rotating body 20.

A shape of the rotating body 20 may be adapted to a shape of the through groove 103 of the terminal body 10, and may be substantially cuboid shape. The rotating body 20 may further include a third end face 20c, a fourth end face opposite to the third end face, a fifth end face and a sixth end face opposite to the fifth end face. A first connecting structure 201 may be arranged on the third end face 20c. A second connecting structure may be arranged on the fourth end face. The first connecting structure 201 and the second connecting structure may be arranged along a first axis. The first connecting structure 201 may be rotatably installed along the first axis in the fifth connecting structure 1032 on the first side wall face 1031. The second connecting structure may be rotatably installed along the first axis in the sixth connecting structure on the second side wall face.

In some embodiment, the first connecting structure 201 and the second connecting structure may be both columnar structures.

FIG. 4 illustrates an enlarged view of area A in FIG. 3. The fifth connecting structure 1032 may be a groove defined at the first side wall face 1031 of the through groove 103. The sixth connecting structure may be a groove defined at the second side wall face of the through groove 103.

In a practical application, the fifth connecting structure 1032 and the sixth connecting structure may be elongated. A length of each of the fifth connecting structure 1032 and the sixth connecting structure may be greater than a diameter of each of the first connecting structure 201 and the second connecting structure. Therefore, there is a certain void space before the rotation, so that an edge of the rotating body 20 and the terminal body 10 may be prevented from colliding or squeezing when the rotating body 20 is rotated. When the rotating 20 needs to rotate, the rotating 20 may slide a predetermined distance along a longitudinal direction of the groove away from the terminal body 10, then the rotating 20 may rotates, and the rotator 20 may slide back after rotating to a predetermined angle.

The first and second display screens 11, 21 each have a front surface. The front surface may mean display surface. When the rotating body 20 rotates such that the second end face faces the front face of the terminal body 10, the front face of the first display screen 11 and the front face of the second display screen 21 may be located in a same plane.

In a practical application, the first display screen 11 may include a first boundary line, and the second display screen 21 may include a second boundary line. When the rotating body 20 is rotated such that the second end face 20b faces the front face of the terminal body 10, the first boundary line may coincide with the second boundary line. The first boundary line may be distributed along a boundary line between the through groove 103 and the front face of the terminal body 10. The second boundary line may be distributed along a boundary line between the through groove 103 and the front or the rear face of the terminal body 10. Therefore, when the first display screen 11 and the second display screen 21 are spliced to display, the first display screen 11 and the second display screen 21 may be better spliced to maintain the consistency of a picture.

In a practical application, a first conductive line may be arranged in the first connecting structure 201. A second conductive line may be arranged in the second connecting structure. A fifth conductive line may be arranged in the fifth connecting structure. A sixth conductive line may be arranged in the sixth connecting structure. When the first connecting structure 201 is installed in the fifth connecting structure 1032, the first conductive line may be electrically coupled to the fifth conductive line. When the second connecting structure is installed in the sixth connecting structure, the second conductive line may be electrically coupled to the sixth conductive line. Therefore, power supply and data interaction of the first camera 22 and the second display screen 21 in the rotating 20, may be realized.

In summary, in the embodiment of the present disclosure, a rotating body may be arranged on the terminal body, and a first camera may be arranged on a first end face of the rotating body. By rotating the rotating body, the terminal may be simultaneously realized the front camera function and the rear camera function by only one camera. Further, because the second display screen is arranged on the second end face opposite to the first end face of the rotating body, the second display screen and the first display screen on the terminal body may be spliced to display, when the rear camera function is realized. It may be beneficial to increase the screen ratio.

Figure 5:
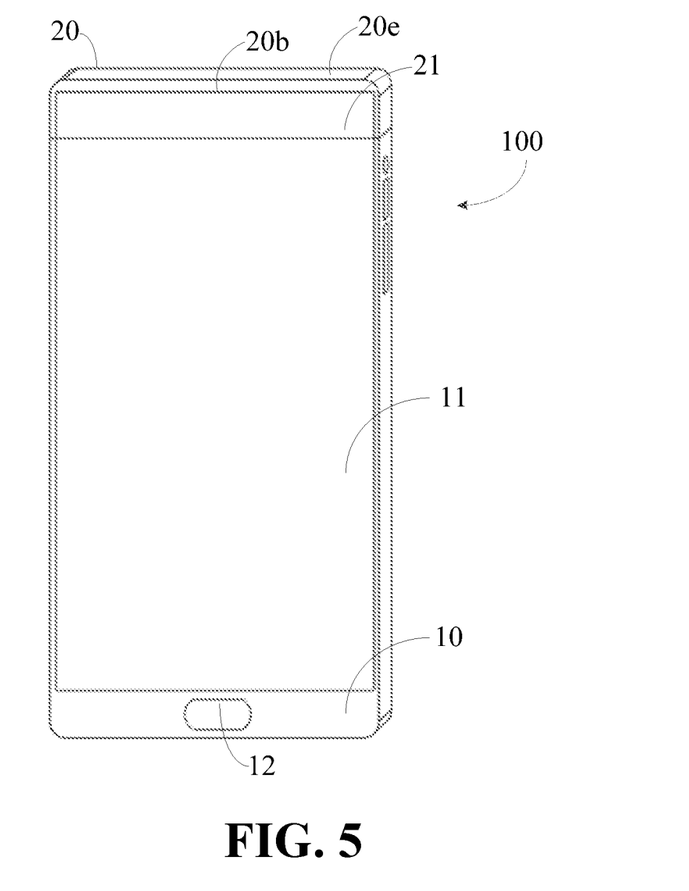
FIG. 5 is another structural illustration of a terminal in accordance with an embodiment in the present disclosure.
Figure 6:
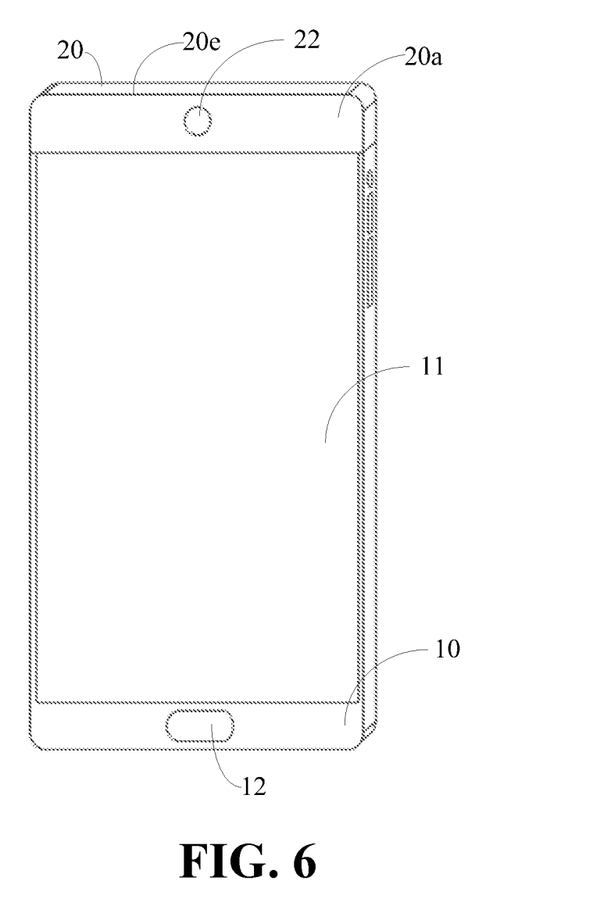
FIG. 6 is another structural illustration of a terminal in accordance with an embodiment in the present disclosure.
Figure 7:
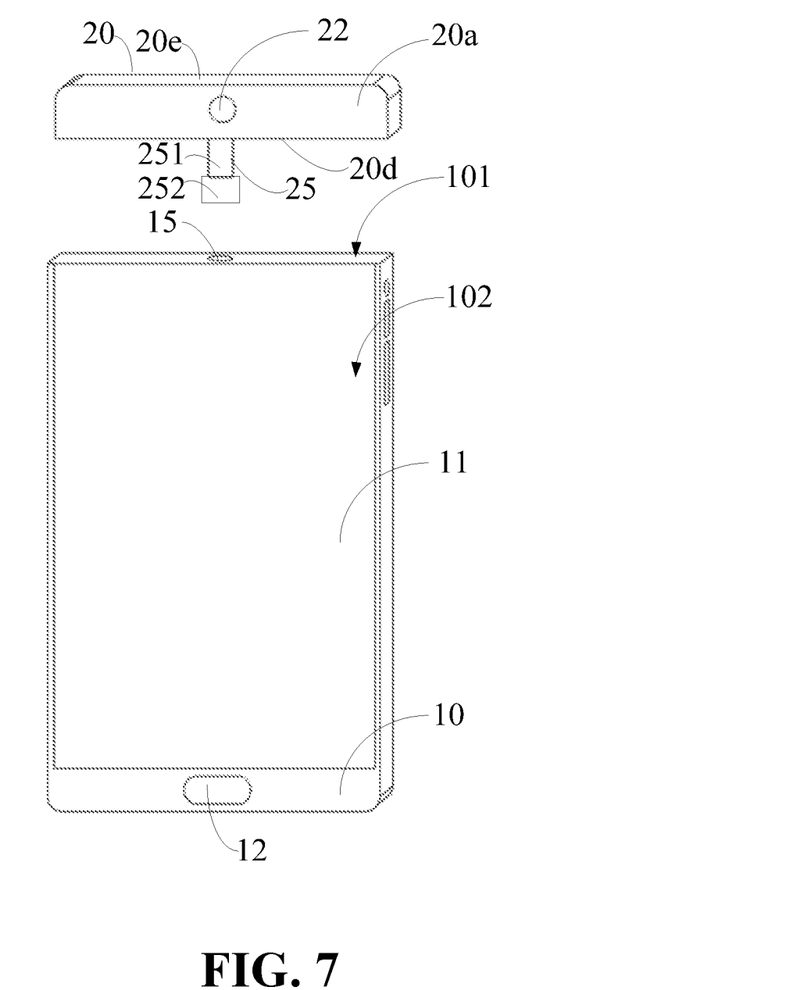
FIG. 7 is an exploded structural illustration of a terminal shown in FIG. 6.

FIG. 5 illustrates another structural illustration of a terminal in accordance with an embodiment in the present disclosure. FIG. 6 illustrates another structural illustration of a terminal in accordance with an embodiment in the present disclosure. FIG. 7 illustrates exploded structural illustration of a terminal shown in FIG. 6. In some embodiments, the terminal 100 may be a mobile phone, an IPAD, and the like. The terminal 100 may include a terminal body 10 and a rotating body 20.

A first display screen 11, a fingerprint module 12, a processor, a circuit board, and a sensor module may be arranged on the terminal body 10. The first display screen 11 may be a liquid crystal display screen or an organic light-emitting diode display screen. The fingerprint module 12 may capture a user's fingerprint and may be arranged on a front face of the terminal body 10. The processor, the circuit board, and the sensor module may be all arranged in the terminal body 10. The processor and sensor module may be arranged on the circuit board and electrically coupled to the circuit board.

The rotating body 20 may include a first end face 20a and a second end face 20b. The first end face 20a and the second end face 20b may be opposite to each other. A first camera 22 may be arranged on the first end face 20a. A second display screen 21 may be arranged on the second end face 20b. The rotating body 20 may be rotatably coupled to the terminal body 10, so that the first end face 20a of the rotating body 20 may selectively face toward around the terminal body 10. For example, the first end face 20a may face the front face of the terminal body 10, or the first end face 20a may face a rear face of the terminal body 10, or the first end face 20a may face one of two lateral faces of the terminal body 10.

For example, when the first camera 22 is required to realize the rear camera function (shown in FIG. 5), the second end face 20b may directly face the front face of the terminal body 10, and the first end face 20a may directly face the rear face of the terminal body 10. In addition, in this case, the first display screen 11 and the second display screen 21 may be spliced to display. When the first camera 22 is required to realize the front camera function (shown in FIG. 6), the first end face 20a may directly face the front face of the terminal body 10, and the second end face 20b may directly face the rear face of the terminal body 10.

In a practical application, the terminal body 10 may be substantially cuboid shape. Corners of the terminal body 10 may be rounded or chamfered. The terminal body 10 may include a top end face 101 and a bottom end face opposite to each other. The terminal body 10 may include two side faces opposite to each other. The terminal body 10 may include a front face 102 and a rear face opposite to each other. A fourth connecting structure 15 may be provided on a top end face 101 of the terminal body 10.

The rotating body 20 may further include a third end face, a fourth end face opposite to the third end face, a fifth end face 20d and a sixth end face 20e opposite to the fifth end face 20d. The fifth end face 20d may face the top end face 101 of the terminal body 10. A third connecting structure 25 may be arranged on the fifth end face 20d.

The third connecting structure 25 may be rotatably coupled to the fourth connecting structure 15 around a second axis. The second axis may be perpendicular to the top end face 101 of the terminal body 10. Thus, rotatably arranging the rotating body 20 on the terminal body 10 may be realized.

In a practical application, the first display screen 11 may include a first boundary line, and the second display screen 21 may include a second boundary line. When the rotating body 20 is rotated such that the second end face 20b faces the front face of the terminal body 10, a boundary line of the first display screen 11 facing the second display screen 21 may coincide with a boundary line of the second display screen 21 facing the first display screen 11. Therefore, when the first display screen 11 and the second display screen 21 are spliced to display, the first display screen 11 and the second display screen 21 may be better spliced to maintain the consistency of a screen.

In some embodiments, the third connecting structure 25 may include a columnar rotating shaft 251 arranged on the fifth end face 20d, and a limiting protrusion 252 arranged on an end of the rotating shaft 251 away from the rotating body 20. The limiting protrusion 252 may be arranged on a side wall face of the rotating shaft 251. The limiting protrusion 252 may be annular and arranged coaxially with the rotating shaft 251.

Figure 8:
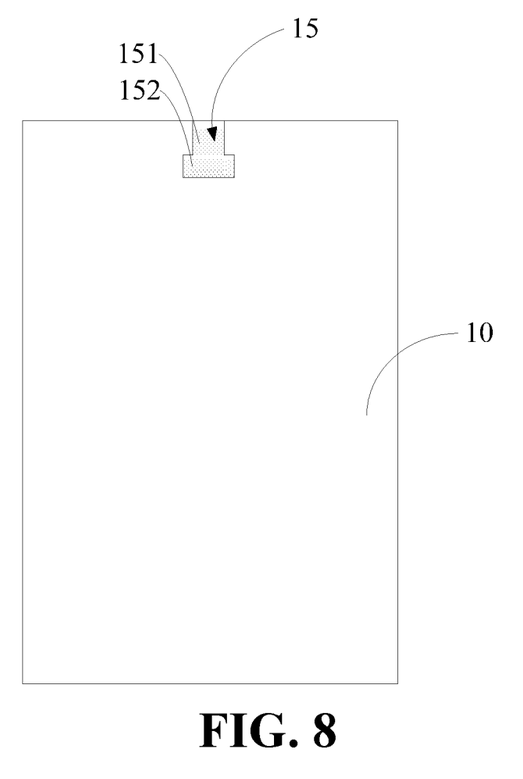
FIG. 8 is a plane view structural illustration of a terminal shown in FIG. 6.

Referring to FIG. 8, the fourth connecting structure 15 may be a stepped hole defined in the terminal body 10 at the top end face 101. The fourth connecting structure 15 may include a first stepped hole 151 and a second stepped hole 152 that are coaxially disposed and communicated. The first stepped hole 151 may be adjacent to the top end face 101. The second stepped hole 152 may be away from the top end face 101. When the third connecting structure 25 is installed in the fourth connecting structure 15, the rotating shaft 251 may be arranged in the first stepped hole 151, and the limiting protrusion 252 may be received in the second stepped hole 152. A radius of the first step hole 151 may be adapted to a radius of the rotating shaft 251. A radius of the second step hole 152 may be adapted to a radius of the limit protrusion 252. The radius of the second step hole 152 may be larger than the radius of the first order hole 151, and slightly larger than the radius of the limiting protrusion 252.

In a practical application, a third conductive line may be arranged in the third connecting structure 25. A fourth conductive line may be arranged in the fourth connecting structure 15. When the third connecting structure 25 is installed in the fourth connecting structure 15, the third conductive line may be electrically coupled to the fourth conductive line. Therefore, power supply and data interaction of the first camera 22 and the second display screen 21, may be realized.

Figure 9:
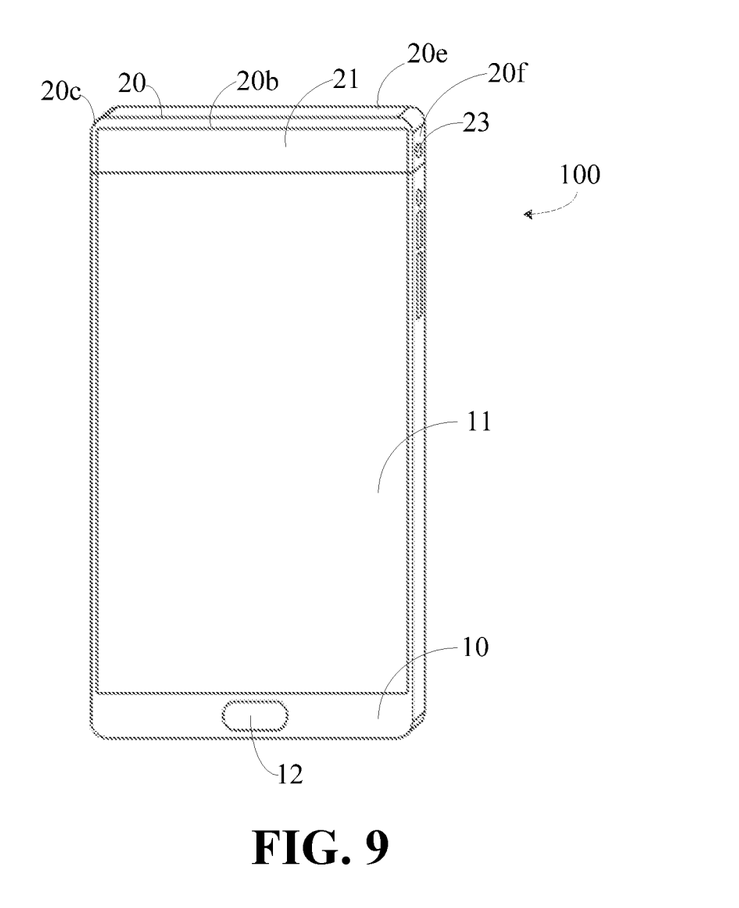
FIG. 9 is another structural illustration of a terminal in accordance with an embodiment in the present disclosure.
Figure 10:
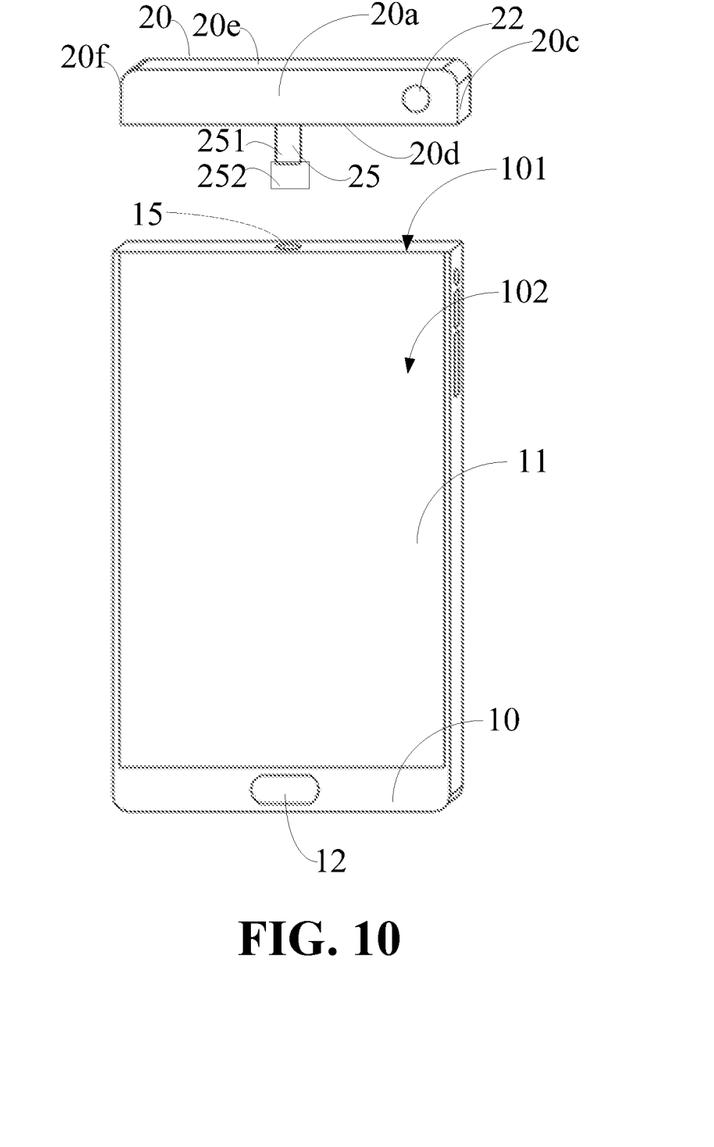
FIG. 10 is another structural illustration of a terminal in accordance with an embodiment in the present disclosure.
Figure 11:
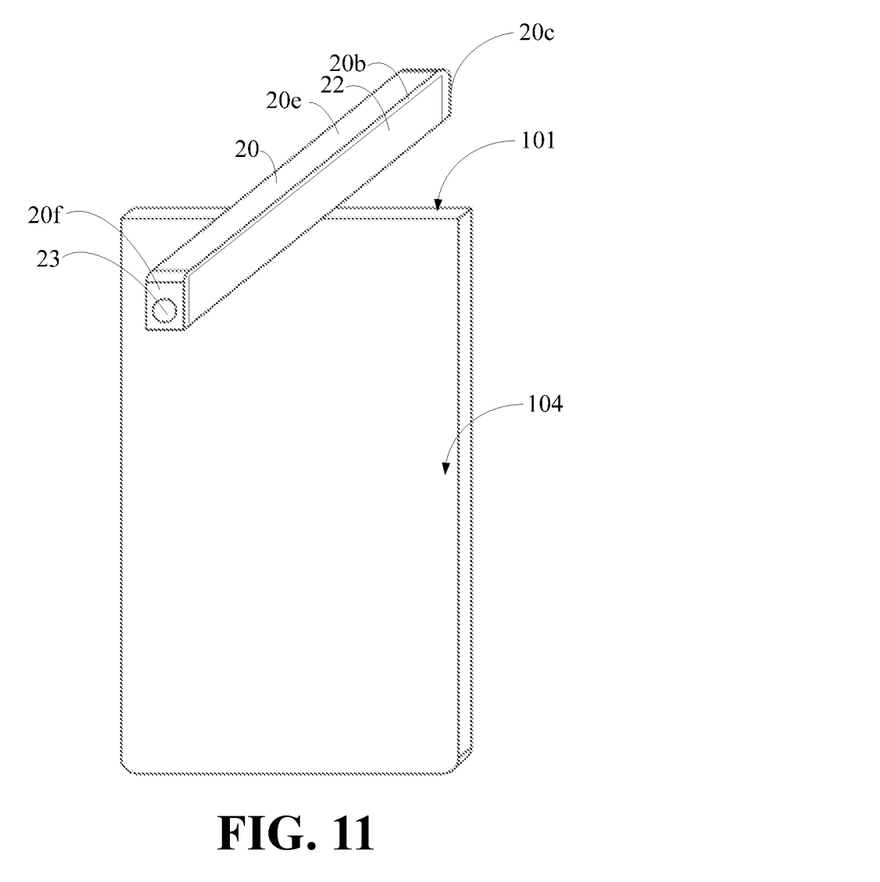
FIG. 11 is another structural illustration of a terminal in accordance with an embodiment in the present disclosure.

Referring to FIGS. 9-11, in some embodiments, the terminal 100 may be a mobile phone, an IPAD, and the like. The terminal 100 may include a terminal body 10 and a rotating body 20.

A first display screen 11, a fingerprint module 12, a processor, a circuit board, and a sensor module may be arranged on the terminal body 10. The first display screen 11 may be a liquid crystal display screen or an organic light-emitting diode display screen. The fingerprint module 12 may capture a user's fingerprint and may be arranged on a front face of the terminal body 10. The processor, the circuit board, and the sensor module may be all arranged in the terminal body 10. The processor and sensor module may be arranged on the circuit board and electrically coupled to the circuit board.

The rotating body 20 may include a first end face 20a, a second end face 20b, a third end face 20c, a fourth end face 20d, a fifth end face 20e, a sixth end face 20f. The first end face 20a and the second end face 20b may be opposite to each other. The third end face 20c and the fourth end face 20d may be opposite to each other. The fifth end face 20e and the sixth end face 20f may be opposite to each other. A first camera 22 may be arranged on the first end face 20a of the rotating body 20. A second display screen 21 may be arranged on the second end face 20b of the rotating body 20. A second camera 23 may be arranged on the fourth end face 20f of the rotating body 20.

The rotating body 20 may be rotatably coupled to the terminal body 10, so that the first end face 20a of the rotating body 20 may selectively face toward around the terminal body 10. For example, the first end face 20a may face the front face of the terminal body 10, or the first end face 20a may face a rear face of the terminal body 10, or the first end face 20a may face one of two lateral faces of the terminal body 10.

The fourth end face 20f may be perpendicular to a width direction of the terminal body 10 and parallel to a length direction of the terminal body 10. The first end face 20a and the second end face 20b may be perpendicular to a thickness direction of the terminal body 10. A length of the rotating body 20 along the width direction of the terminal body 10 may be greater than a length of the rotating body 20 along the thickness direction of the terminal body 10. The second camera 23 may be arranged in the rotating body 20. The second camera 23 may extend along the width direction of the terminal body 10. A light incident face of the second camera 23 may be located at the fourth end face 20f. A lens length of the second camera 23 may be greater than a lens length of the first camera 22. The first camera 22 may be arranged on a side of the first end face 20a away from the fourth end face 20f.

For example, when the first camera 22 is required to realize the rear camera function (shown in FIG. 9), the second end face 20b may directly face the front face of the terminal body 10, and the first end face 20a may directly face the rear face of the terminal body 10. In addition, in this case, the first display screen 11 and the second display screen 21 may be spliced to display. When the first camera 22 is required to realize the front camera function (shown in FIG. 10), the first end face 20a may directly face the front face of the terminal body 10, and the second end face 20b may directly face the rear face of the terminal body 10. When the second camera 23 with a long lens is required to realize the rear camera function (shown in FIG. 11), the rotator 20 may be rotated so that the fourth end face 20f may face the rear face 104 of the terminal body 10.

In a practical application, the terminal body 10 may be substantially cuboid shape. Corners of the terminal body 10 may be rounded or chamfered. The terminal body 10 may include a top end face 101 and a bottom end face opposite to each other. The terminal body 10 may include two side faces opposite to each other. The terminal body 10 may include a front face 102 and a rear face 104 opposite to each other. A fourth connecting structure 15 may be provided on a top end face 101 of the terminal body 10.

A third connecting structure 25 may be arranged on the fifth end face 20d of the rotating body 20. The third connecting structure 25 may be rotatably coupled to the fourth connecting structure 15 around a second axis. The second axis may be perpendicular to the top end face 101 of the terminal body 10. Thus, rotatably arranging the rotating body 20 on the terminal body 10 may be realized.

In some embodiments, the third connecting structure 25 may include a columnar rotating shaft 251 arranged on the fifth end face 20d, and a limiting protrusion 252 arranged on an end of the rotating shaft 251 away from the rotating body 20. The limiting protrusion 252 may be arranged on a side wall face of the rotating shaft 251. The limiting protrusion 252 may be annular and arranged coaxially with the rotating shaft 251.

Figure 12:
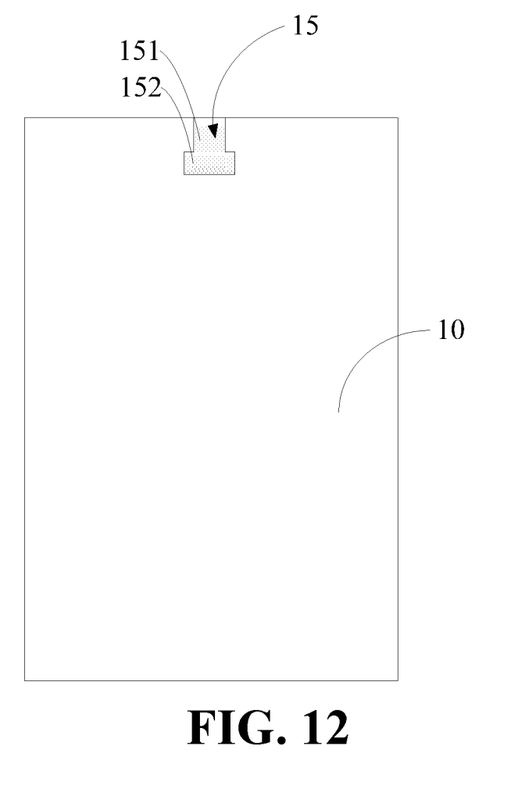
FIG. 12 is a partial plane view structural illustration of a terminal shown in FIG. 9.

Referring to FIG. 12, the fourth connecting structure 15 may be a stepped hole defined in the terminal body 10 at the top end face 101. The stepped hole may include a first stepped hole 151 and a second stepped hole 152 that are coaxially disposed and communicated. The first stepped hole 151 may be adjacent to the top end face 101. The second stepped hole 152 may be away from the top end face 101. When the third connecting structure 25 is installed in the fourth connecting structure 15, the rotating shaft 251 may be arranged in the first stepped hole 151, and the limiting protrusion 252 may be received in the second stepped hole 152. A radius of the first step hole 151 may be adapted to a radius of the rotating shaft 251. A radius of the second step hole 152 may be adapted to a radius of the limit protrusion 252. The radius of the second step hole 152 may be larger than the radius of the first order hole 151, and slightly larger than the radius of the limiting protrusion 252.

In a practical application, a third conductive line may be arranged in the third connecting structure 25. A fourth conductive line may be arranged in the fourth connecting structure 15. When the third connecting structure 25 is installed in the fourth connecting structure 15, the third conductive line may be electrically coupled to the fourth conductive line. Therefore, power supply and data interaction of the second display screen 21, the first camera 22 and the second camera 23, may be realized.

In the description of the present disclosure, the description with reference to the terms "one embodiment", "some embodiments", "illustrative embodiment", "example", "specific example", "some examples", and the like, may refer to specific features, structures, materials, or characteristics described in the embodiments or examples included in at least one embodiment or example of the disclosure. In the present disclosure, the schematic representation of the above terms may not necessarily mean the same embodiment or example. Furthermore, particular features, structures, materials, or characteristics described may be combined in a suitable manner in any one or more embodiments or examples.

It is understood that the descriptions above are only embodiments of the present disclosure. It is not intended to limit the scope of the present disclosure. Any equivalent transformation in structure and/or in scheme referring to the instruction and the accompanying drawings of the present disclosure, and direct or indirect application in other related technical field, are included within the scope of the present disclosure.

What is claimed is:

1. A terminal, comprising:
a terminal body; and
a rotating body comprising a first end face,
wherein a first camera is arranged on the first end face;
wherein the rotating body is rotatably coupled to one end of the terminal body, so that the first camera selectively faces toward around the terminal body;
wherein a first display screen is arranged on a front face of the terminal body;
wherein the rotating body further comprises a second end face opposite to the first end face;
wherein a second display screen is arranged on the second end face;
wherein when the rotating body is rotated such that the second end face faces the front face of the terminal body, front surfaces of the first display screen and the second display screen are located in a same plane,
wherein the rotating body further comprises a fifth end face facing the terminal body;
wherein a third connecting structure is arranged on the fifth end face;
wherein a fourth connecting structure is provided on a top end face of the terminal body;
wherein the third connecting structure is rotatably coupled to the fourth connecting structure around a second axis;
wherein the second axis is perpendicular to the top end face of the terminal body;
wherein the third connecting structure comprises:
a columnar rotating shaft arranged on the fifth end face; and
a limiting protrusion arranged on an end of the rotating shaft away from the rotating body;
wherein the limiting protrusion is arranged on a side wall face of the rotating shaft;
wherein the limiting protrusion is annular and arranged coaxially with the rotating shaft;
wherein the fourth connecting structure comprises:
a first stepped hole defined on the top end face; and
a second stepped hole defined on the top end face;
wherein the first stepped hole is coaxial and communicated with the second stepped hole;
wherein the first stepped hole is adjacent to the top end face;
wherein the second stepped hole is away from the top end face;
wherein when the third connecting structure is installed in the fourth connecting structure, the rotating shaft is inserted in the first step hole, and the limiting protrusion is received in the second step hole;
wherein a radius of the first step hole is adapted to a radius of the rotating shaft;
wherein a radius of the second step hole is adapted to a radius of the limit protrusion; and
wherein the radius of the second step hole is larger than the radius of the first step hole.

* * * * *